United States Patent
Rao et al.

(10) Patent No.: US 9,965,209 B2
(45) Date of Patent: May 8, 2018

(54) LARGE-SCALE, DYNAMIC GRAPH STORAGE AND PROCESSING SYSTEM

(71) Applicant: NEC Laboratories America, Inc., Princeton, NJ (US)

(72) Inventors: Kunal Rao, Plainsboro, NJ (US); Giuseppe Coviello, Plainsboro, NJ (US); Srimat Chakradhar, Manalapan, NJ (US); Souvik Bhattacherjee, College Park, MD (US); Srihari Cadambi, Princeton, NJ (US)

(73) Assignee: NEC Corporation (JP)

( * ) Notice: Subject to any disclaimer, the term of this patent is extended or adjusted under 35 U.S.C. 154(b) by 382 days.

(21) Appl. No.: 14/831,809

(22) Filed: Aug. 20, 2015

(65) Prior Publication Data

US 2016/0110409 A1 Apr. 21, 2016

Related U.S. Application Data

(60) Provisional application No. 62/118,511, filed on Feb. 20, 2015, provisional application No. 62/118,510, (Continued)

(51) Int. Cl.
*G06F 3/06* (2006.01)
*G06F 17/30* (2006.01)
*G06T 11/20* (2006.01)

(52) U.S. Cl.
CPC .......... *G06F 3/0638* (2013.01); *G06F 3/0604* (2013.01); *G06F 3/067* (2013.01); (Continued)

(58) Field of Classification Search
CPC .... G06F 3/0638; G06F 3/0604; G06F 3/0619; G06F 3/067; G06F 17/30368; (Continued)

(56) References Cited

U.S. PATENT DOCUMENTS

2015/0363461 A1* 12/2015 Behal ................ G06F 17/30424
707/722

OTHER PUBLICATIONS

Chen, W. et al., "Cardinality Change-based Early Detection of Large-scale Cyber-Attacks," INFOCOM, 2013 Proceedings IEEE, Apr. 2013. (pp. 1-9).
(Continued)

*Primary Examiner* — Eric Cardwell
(74) *Attorney, Agent, or Firm* — Joseph Kolodka

(57) ABSTRACT

A method in a graph storage and processing system is provided. The method includes storing, in a scalable, distributed, fault-tolerant, in-memory graph storage device, base graph data representative of graphs, and storing, in a real-time, in memory graph storage device, update graph data representative of graph updates for the graphs with respect to a time threshold. The method further includes sampling the base graph data to generate sampled portions of the graphs and storing the sampled portions, by an in-memory graph sampler. The method additionally includes providing, by a query manager, a query interface between applications and the system. The method also includes forming, by the query manager, graph data representative of a complete graph from at least the base graph data and the update graph data, if any. The method includes processing, by a graph computer, the sampled portions using batch-type computations to generate approximate results for graph-based queries.

19 Claims, 4 Drawing Sheets

Related U.S. Application Data filed on Feb. 20, 2015, provisional application No. 62/064,083, filed on Oct. 15, 2014.

(52) U.S. Cl.
CPC ...... *G06F 3/0619* (2013.01); *G06F 17/30368* (2013.01); *G06F 17/30371* (2013.01); *G06F 17/30374* (2013.01); *G06F 17/30424* (2013.01); *G06F 17/30867* (2013.01); *G06F 17/30876* (2013.01); *G06F 17/30958* (2013.01); *G06T 11/206* (2013.01)

(58) Field of Classification Search
CPC ......... G06F 17/30371; G06F 17/30374; G06F 17/30424; G06F 17/30867; G06F 17/30876; G06F 17/30958; G06T 11/206
See application file for complete search history.

(56) References Cited

OTHER PUBLICATIONS

De Domenico, M. et al., "The Anatomy of a Scientific Rumor," Scientific Reports, vol. 3, No. 2980, Oct. 2013. (pp. 1-9).

Dijkstra, E. W., "A Note on Two Problems in Connexion with Graphs," Numerische Mathematik, Col. 1, No. 1, Dec. 1959. (pp. 1-3).

Gaston, M.E, "Using Graph Diameter for Change Detection in Dynamic Networks," Australian Journal of Combinatorics, vol. 35, Jan. 2006. (pp. 299-311).

Karypis, G. et al., "A Fast and High Quality Multilevel Scheme for Partitioning Irregular Graphs," Siam J. Sci. Comput. vol. 20, No. 1, Aug. 1998. (pp. 359-392).

Leskovec, J. et al., "Graphs over Time: Densification Laws, Shrinking Diameters and Possible Explanations," Proceedings of the eleventh ACM SIGKDD international conference on Knowledge discovery in data mining, Aug. 2005. (pp. 177-187).

Rozenshtein, R. et al., "Event Detection in Activity Networks," Proceedings of the 20th ACM SIGKDD international conference on Knowledge discovery and data mining, Aug. 2014. (pp. 1176-1185).

Kifer, D. et al., "Detecting Change in Data Streams," Proceedings of the Thirtieth international conference on Very large data bases, vol. 30, Aug. 2004. (pp. 180-191).

Wong, W. K, et al., "What's Strange About Recent Events (WSARE): An Algorithm for the Early Detection of Disease Outbreaks," Journal of Machine Learning Research, vol. 6, Dec. 2005. (pp. 1961-1998).

Gupta, M. et al., "Outlier Detection for Temporal Data: A Survey," IEEE Transactions on Knowledge and Data Engineering, vol. 26, No. 9, Sep. 2014. (pp. 2250-2267).

Backstrom, L. et al., "Group Formation in Large Social Networks: Membership, Growth, and Evolution," Proceedings of the 12th ACM SIGKDD international conference on Knowledge discovery and data mining, Aug. 2006. (pp. 44-54).

Aggarwal, C. et al., "Evolutionary Network Analysis: A Survey," ACM Computing Surveys, vol. 47, No. 1, Apr. 2014. (pp. 1-36).

Bilgin, C.C. et al., "Dynamic Network Evolution: Models, Clustering, Anomaly Detection," Rensselaer Polytechnic Institute. 2006. (pp. 1-13).

Kapsabelis, K.M. et al., "Investigation of Graph Edit Distance Cost Functions for Detection of Network Anomalies," Anziam Journal, vol. 48, Aug. 2007. (pp. 1-14).

Gao, X. et al., "A survey of graph edit distance," Pattern Anal Applic, Jan. 2009. (pp. 113-129).

Pincombe, B., "Anomaly Detection in Time Series of Graphs using ARMA Processes," www.asor.org, Dec. 2005. (pp. 1-10). Available at: www.asor.org.au/publication/files/dec2005/Bra-paper.pdf.

Bunke, H. et al., "Computer Network Monitoring and Abnormal Event Detection Using Graph Matching and Multidimensional Scaling," Advances in Data Mining. Applications in Medicine, Web Mining, Marketing, Image and Signal Mining, vol. 4065, Jul. 2006. (pp. 1-15).

Papadimitriou, P. et al., Web graph similarity for anomaly detection, J Internet Serv Appl, vol. 1, Feb. 2010. (pp. 19-30).

Berlingerio, M. et al., "NetSimile: A Scalable Approach to Size-Independent Network Similarity," arXiv:1209.2684, Sep. 2012. (pp. 1-12).

Koutra, D. et al., "DELTACON: A Principled Massive-Graph Similarity Function," arXiv:1304.4657, Apr. 2013. (pp. 1-11).

Rossi, R. et al., "Role-Dynamics: Fast Mining of Large Dynamic Networks," arXiv:1203.2200, Mar. 2012. (pp. 1-9).

Akoglu, L. et al., "Event Detection in Time Series of Mobile Communication Graphs," www3.cs.stonybrook.edu, 2010. (pp. 1-8). Available at: http://webcache.googleusercontent.com/search?q=cache:_X_DklaVPhQJ:www3.cs.stonybrook.edu/~leman/pubs/EVENTDETECTION_AkogluFaloutsos.pdf+&cd=1&hl=en&ct=clnk&gl=us.

Ide, T. et al., "Eigenspace-based Anomaly Detection in Computer Systems," Proceedings of the tenth ACM SIGKDD international conference on Knowledge discovery and data mining, Aug. 2004. (pp. 440-449).

Sun, J. et al., "Less is More: Compact Matrix Decomposition for Large Sparse Graphs," Proceedings of the 2007 SIAM International Conference on Data Mining, Apr. 2007. (pp. 1-12).

Sun, J. et al., "GraphScope: Parameter-free Mining of Large Time-evolving Graphs," Proceedings of the 13th ACM SIGKDD international conference on Knowledge discovery and data mining, Aug. 2007. (pp. 1-10).

Aggarwal, C.C. et al., "Outlier Detection in Graph Streams," 2011 IEEE 27th International Conference on Data Engineering, Apr. 2011. (pp. 399-409).

Heard, N. et al., "Bayesian Anomaly Detection Methods for Social Networks," The Annals of Applied Statistics, vol. 4, No. 2, Aug. 2010. (pp. 1-18).

Mongiovi, M. et al., "NetSpot: Spotting Significant Anomalous Regions on Dynamic Networks," Proceedings of the SIAM International Conference on Data Mining, May 2013. (pp. 1-9).

Peel, L. et al., "Detecting change points in the large-scale structure of evolving networks," AAAI'15 Proceedings of the Twenty-Ninth AAAI Conference on Artificial Intelligence, Jan. 2015. (pp. 1-11).

Akoglu, L. et al., "Graph based anomaly detection and description: a survey," Data Mining and Knowledge Discovery, vol. 29 Issue 3, May 2015. (pp. 1-63).

Anderson, et al., "CouchDB: The Definitive Guide Time to Relax. O'Reilly Media, Inc.", 1st edition Jan. 2010, 272 pages.

Mike Buerli, "The current state of graph databases", Department of Computer Science Cal Poly San Luis Obispo, Dec. 2012, pp. 1-7.

Cheng, et al., "Kineograph: Taking the pulse of a fast-changing and connected world", In Proceedings of the 7th ACM European Conference on Computer Systems, EuroSys'12, Apr. 2012, pp. 85-98.

Ediger, et al., "Stinger: high performance data structure for streaming graphs", In IEEE Conference on High Performance Extreme Computing, HPEC 2012, Sep. 2012, pp. 1-5.

Gonzalez, et al., "Distributed graph-parallel computation on natural graphs", In Proceedings of the 10th USENIX Conference on Operating Systems Design and Implementation, OSDI'12, Oct. 2012, pp. 17-30.

Gubbi, et al., "Internet of things (iot): A vision, architectural elements, and future directions", Future Gener. Comput. Syst., 29(7), Sep. 2013, pp. 1645-1660.

Iordanov, Hypergraphdb: "A generalized graph database", In Proceedings of the 2010 International Conference on Web-age Information Management, WAIM'10, Jul. 2010, pp. 25-36.

Kang, et al., "Pegasus: A peta-scale graph mining system implementation and observations", In Proceedings of the 2009 Ninth IEEE International Conference on Data Mining, ICDM '09, IEEE Computer Society, Dec. 2009, pp. 229-238.

Kyrola, et al., "Graphchi: Large-scale graph computation on just a pc", In Proceedings of the 10th USENIX Conference on Operating Systems Design and Implementation, OSDI'12, Oct. 2012, pp. 31-46.

(56) References Cited

OTHER PUBLICATIONS

Low, et al., "Distributed graphlab: A framework for machine learning and data mining in the cloud", Proc. VLDB Endow., 5(8), Apr. 2012, pp. 716-727.
Malewicz, et al., "Pregel: A system for large-scale graph processing", In Proceedings of the 2010 ACM SIGMOD International Conference on Management of Data, SIGMOD '10, Jun. 2010, pp. 135-146.
Mondal, et al., "Managing large dynamic graphs efficiently", In Proceedings of the 2012 ACM SIGMOD International Conference on Management of Data, SIGMOD '12, May 2012, pp. 145-156.
Murray, et al., "Naiad: A timely dataflow system", In Proceedings of the Twenty-Fourth ACM Symposium on Operating Systems Principles, SOSP '13, Nov. 2013, pp. 439-455.
Page, et al., "The pagerank citation ranking: Bringing order to the web. In Proceedings of the 7th International World Wide Web Conference", Jan. 1998, pp. 161-172.
Roy, et al., "X-stream: Edge-centric graph processing using streaming partitions", In Proceedings of the Twenty-Fourth ACM Symposium on Operating Systems Principles, SOSP '13, Nov. 2013, pp. 472-488.
Sherif Sakr, "Processing large-scale graph data: A guide to current technology", IBM Corporation, Jun. 2013, pp. 1-13.
Shao, et al., "Trinity: A distributed graph engine on a memory cloud", Proceedings of the 2013 ACM SIGMOD International Conference on Management of Data, SIGMOD '13, Jun. 2013, pp. 505-516.
Xin, et al., "Graphx: A resilient distributed graph system on spark", First International Workshop on Graph Data Management Experiences and Systems, GRADES '13, Jun. 2013, pp. 2:1-2:6.
The Appache Cassandra Project, 2015. Available at: http://cassandra.apache.org/.
Gridgrain Systems, Inc., Gridgrain, In Memory Data Fabric, 2015. Available at: http://gridgain.com/.
The Apache Software Foundation. Last Published: Jul. 7, 2015. Available at: http://hadoop.apache.org/.
Infogrid Web Database, Last Published Jan. 2015. Available at: http://infogrid.org/trac/.
Facebook Statistics, Copyright 2015. Available at: https://blog.kissmetrics.com/facebook-statistics/.
Twitter, Copyright 2015. Available at: https://dev.twitter.com/streaming/overview.
Franz, Inc., W3C. Allegrograph rdfstore web 3.0's database. Sep. 2009. Availabler at: http://www.franz.com/agraph/allegrograph/.
Apache Software Foundation. Copyright 2014. Available at: https://storm.incubator.apache.org/.
Faunus, Graph Analytics Engine, "Quick Start," Release notes dated Sep. 5, 2014, retrieved on Aug. 20, 2015, pp. 1-2. Available at: http://thinkaurelius.github.io/faunus/.
Titan, Distributed Graph Database, "Quick Start," Release notes dated Jun. 9, 2015, retrieved on Aug. 20, 2015, pp. 1-2. Available at: http://thinkaurelius.github.io/titan/.
Graph 500, "The Graph 500 List," Brief Introduction, Jul. 2015, retrieved on Aug. 20, 2015, pp. 1-2. Available at: http://www.graph500.org/.
Hazelcast, "Hazelcast the Leading In-Memory Data Grid—Hazelcast.com," latest version Jul. 2015, retrieved on Aug. 20, 2015, pp. 1-3. Available at http://hazelcast.com/.
Zawodny, "Redis: Lightweight key/value Store That Goes the Extra Mile," Aug. 31, 2009, retrieved Aug. 20, 2015, Linux Magazine, pp. 1-3. Available at: http://www.linux-mag.com/id/7496/.
Neo4j, "Neo4j, the World's Leading Graph Database," Feb. 8, 2015, retrieved Aug. 20, 2015, pp. 1-10. Available at: http://neo4j.com/.
InfiniteGraph, "InfiniteGraph, Objectivity," Jul. 31, 2015, retrieved Aug. 20, 2015, pp. 1-5. Available: http://www.objectivity.com/products/infinitegraph/.
OrientDB, "OrientDB—OrientDB Multi-Model No SQL DatabaseOrientDB Multi-Model NoSQL Database," Jul. 2015, retrieved Aug. 20, 2015, pp. 1-2. Available at: http://www.orientechnologies.com/orientdb/.
Raffi Krikorian, New Tweets per second record, and howl, Aug. 2013. Available at: https://blog.twitter.com/2013/new-tweets-per-second-record-and-how.

\* cited by examiner

LARGE-SCALE, DYNAMIC GRAPH STORAGE AND PROCESSING SYSTEM

RELATED APPLICATION INFORMATION

This application is related to U.S. Utility application Ser. No. 14/831,792 filed Aug. 20, 2015, entitled "Large-Scale, Dynamic Graph Storage and Processing System", and U.S. Utility application Ser. No. 14/831,775 filed Aug. 20, 2015, entitled "Real-Time Abnormal Change Detection in Dynamic Graphs", which are commonly assigned and the disclosures of which are incorporated by reference herein in their entireties.

This application claims priority to provisional application Ser. No. 62/118,511, filed on Feb. 20, 2015, provisional application Ser. No. 62/118,510, filed on Feb. 20, 2015, and provisional application Ser. No. 62/064,083, filed on Oct. 15, 2014, each incorporated herein by reference.

BACKGROUND

Technical Field

The present invention relates to information processing, and more particularly to a large-scale, dynamic graph storage and processing system.

Description of the Related Art

Information in several domains is often best represented in the form of graphs. Exemplary domains include, for example, social networks, transportation networks, biological networks, enterprise networks, and so forth. Services such as Twitter®, Facebook®, Foursquare®, Flickr®, Amazon®, and Yelp® have become very popular and are increasingly being used to post tweets, messages, photos, shop online, write product reviews, and so forth. Data in these domains is very dynamic and is continuously generated at a very rapid pace.

Analysis of rapid data streams to gain insights can be extremely valuable and doing so in a timely manner can be very crucial to retain the competitive advantage, provide new services and create new businesses.

However, prior art systems suffer from many deficiencies including, for example, limited processing and storage capacity, and so forth. Moreover, none of these systems serve as a single platform for fast graph updates and fast query processing for multiple, concurrent online/offline graph application requiring exact/approximate results.

SUMMARY

These and other drawbacks and disadvantages of the prior art are addressed by the present principles, which are directed to a large-scale, dynamic graph storage and processing system.

According to an aspect of the present principles, a method in a graph storage and processing system is provided. The method includes storing, in a scalable, distributed, fault-tolerant, in-memory graph storage device, base graph data representative of graphs. The method also includes storing, in a real-time, in memory graph storage device, update graph data representative of graph updates for the graphs with respect to a time threshold. The method further includes sampling the base graph data to generate sampled portions of the graphs and storing the sampled portions of the graph, by an in-memory graph sampler. The method additionally includes providing, by a query manager, a query interface between applications and the system. The method also includes forming, by the query manager, graph data representative of a complete graph from at least the base graph data in the scalable, distributed, fault-tolerant, in-memory graph storage device and the update graph data, if any, in the real-time, in memory graph storage device. The method additionally includes processing, by a graph computer, the sampled portions of the graphs using batch-type computations to generate approximate results for graph-based queries.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
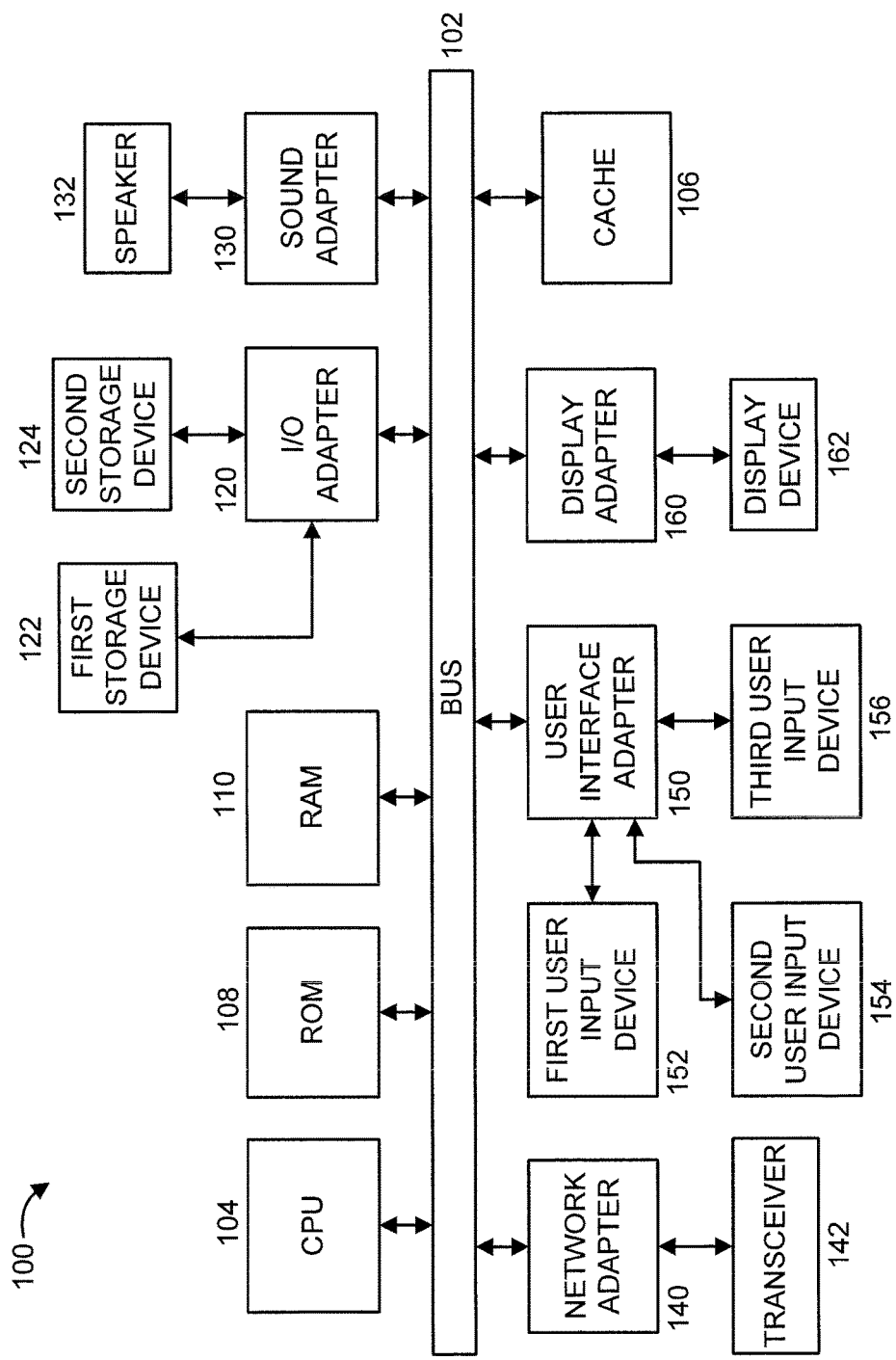
FIG. 1 is a block diagram illustrating an exemplary processing system 100 to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
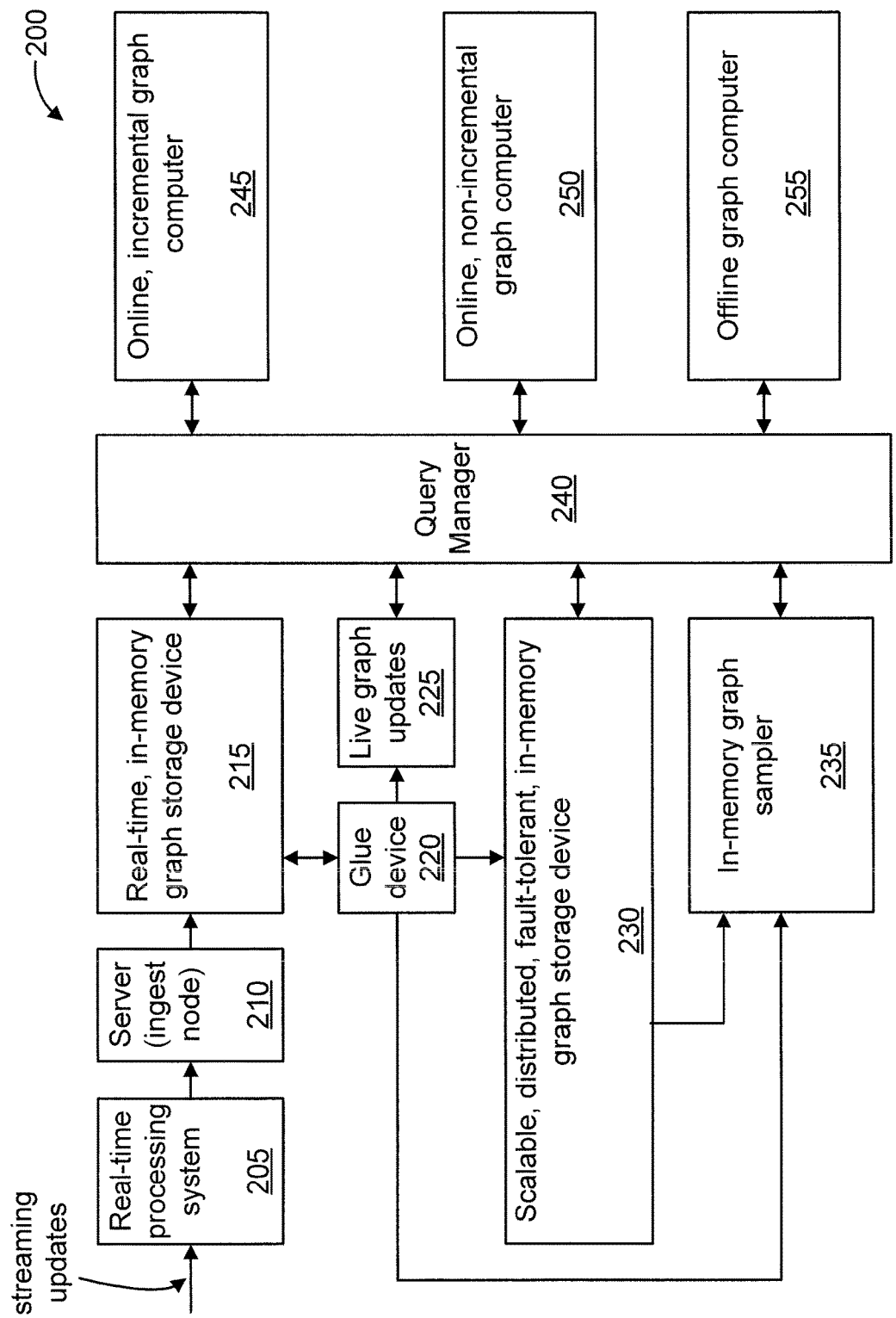
FIG. 2 shows an exemplary system 200 for large-scale, dynamic graph storage and processing, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
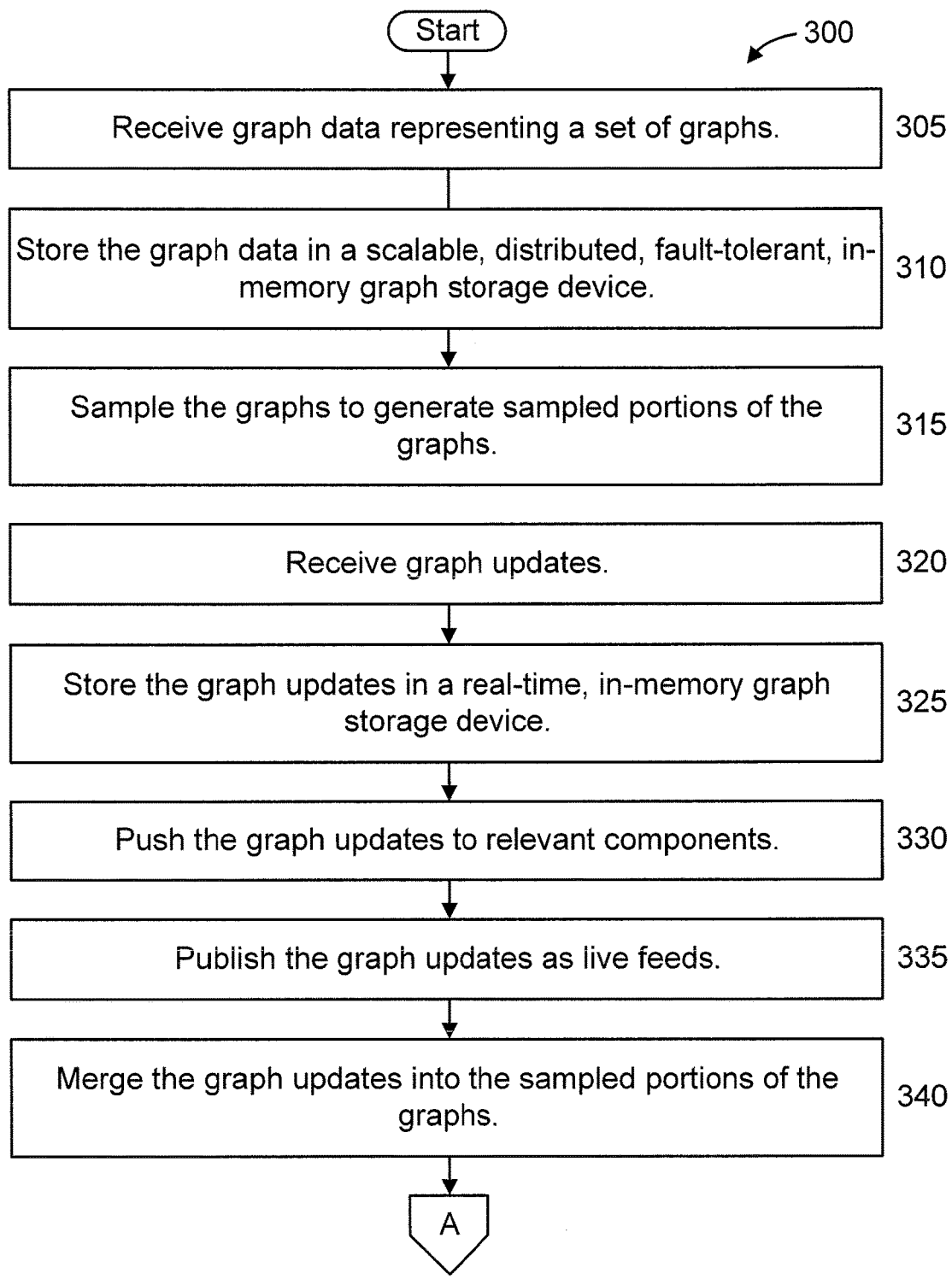
FIGS. 3-4 show an exemplary method 300 for large-scale, dynamic graph storage and processing, in accordance with an embodiment of the present principles.
Figure 4:
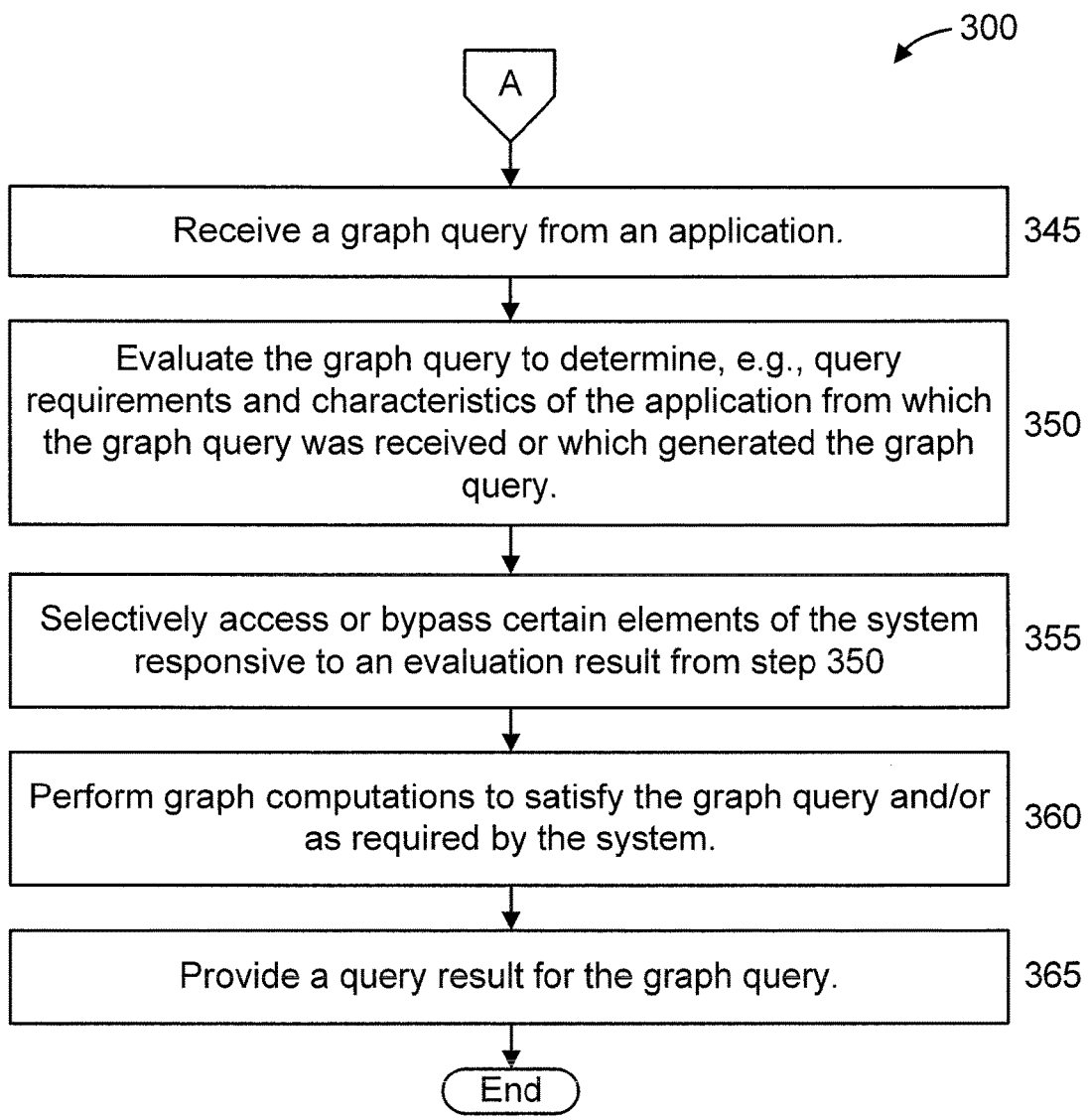

Further, it is to be appreciated that processing system 100 may perform at least part of the method described herein including, for example, at least part of method 300 of FIGS. 3-4. Similarly, part or all of system 200 may be used to perform at least part of method 300 of FIG. 3-4.

FIG. 2 shows an exemplary system 200 for large-scale, dynamic graph storage and processing, in accordance with an embodiment of the present principles.

The system 200 includes: a real-time processing sub-system 205; a server (ingest node) 210; a real-time, in memory graph storage device 215; a glue device 220; a live graph updates 225; a scalable, distributed, fault-tolerant, in-memory graph storage device 230; an in-memory graph sampler 235; a query manager 240; an online, incremental graph computer 245; an online, non-incremental graph computer 250; and an offline graph computer 255.

The real-time processing sub-system 205 continuously receives streaming updates. The sub-system 205 processes the incoming data stream and obtains a single graph operation or a set of graph operations to be performed. The graph operations can be, but are not limited to, adding or removing vertices and edges in the graph. The logic to obtain the graph updates can be customized according to the domain. These graph updates are communicated to the server 210 along with the timestamp of the update.

The server 210 (ingest node) receives graph updates from the real-time processing sub-system 205. The server 210 continuously listens for graph updates and processes them as soon as they are received. The server 210 acts as the entry point for the graph operation and serves as the ingest node. Whenever an update is received, the server 210 immediately pushes the update into the real-time, in memory graph storage device 215. Updates are pushed in the same sequence as they are received, thus maintaining the temporal evolution of the graph.

The real-time, in memory graph storage device 215 receives newly received graph updates that are pushed by the server 210 into the storage device 215. In an embodiment, the storage device 215 is highly optimized for fast graph updates. The rate of updates can be extremely fast in some applications and the highly efficient data structures of this real-time graph storage device 215 makes it possible to rapidly ingest them into the system. The timestamp is also stored, which makes it possible to maintain the exact sequence of the operations. A role of the real-time, in-memory graph storage device 215 is to continuously assimilate new graph updates at a very rapid pace.

The glue device 220 connects different parts of the system 200. The glue device 220 provides three key functionalities. The glue device retires updates in the order they were received from the real-time, in-memory graph storage device 215 and (1) pushes them into the scalable, distributed, fault-tolerant, in-memory graph storage device 230, (2) publishes them as live feeds for online, incremental graph algorithms, and (3) merges them into the latest graph samples being used for online, approximate, non-incremental graph algorithms.

These operations are continuously performed by the glue device 220 in the background, in parallel to the graph insertion performed by the server (ingest node) 210. By performing these operations continuously, it hides the time taken to update the distributed storage device 230 from the application, helps in keeping the memory footprint of the real-time graph storage device 215 very small and acts as the base for online applications.

The live graph updates 225 are published by the glue device 220 for online applications. These live graph updates are published in the same order as they were received by the server (ingest node) 210. Online applications rely on these live feeds for the latest graph changes and take appropriate actions. There is slight delay between the exact time of graph update and it being seen by the online applications. The live feeds are retired after their consumption by all online applications.

The scalable, distributed, fault-tolerant, in-memory graph storage device 230 represents the main storage layer for the underlying graph. The data structures used for graph storage are quite different from the one used in the real-time, in memory graph storage device 215 and are efficient for retrieval and query processing rather than fast updates. The graph structure is partitioned across multiple nodes and stored in-memory for low-latency retrieval. Data is replicated across nodes, which provides fault tolerance in the case where any of the nodes go down. Graph vertices, along with their incoming and outgoing edges, are indexed for efficient retrieval. Temporal information is also stored, thus enabling temporal queries along with structural queries on the graph. The scalable, distributed, fault-tolerant, in-memory graph storage device 230 is continuously updated by the glue by pulling latest graph changes from the real-time, in memory graph storage device 215 into this permanent graph storage layer.

The in-memory graph sampler 235 is used in consideration of the fact that as the size of the graph grows, it becomes increasingly slow for non-incremental graph computations. Thus, in some applications, it is okay to perform the same batch-type computation on a sampled graph to obtain quick, approximate results. This functionality is provided by system 200 through the in-memory graph sampler 235. The distributed, in-memory graph storage device 230 is periodically probed to create a graph sample and this sample is later used by the online applications relying on non-incremental, approximate graph computations. One important point to note is that the graph sample is also merged with the live feeds being pulled by the glue device 220 from the real-time, in memory graph storage device 215. This helps the graph sample to also include some of the latest changes to the graph structure, which might be important for some applications. The exact method and size of graph samples can be changed and customized based on the application requirements. Applications can explore the trade-off between accuracy and response time using different sizes of graph samples. The nomenclature "in-memory" in "in-memory graph sampler" refers to the use of non-disk-based memory for storing the samples, to provide quick access to the samples by avoiding the latencies associated with disk-based memory. Thus, in the embodiment of FIG. 2, the sampler 235 includes non-disk-based memory for storing the samples.

The query manager 240 is the interface between the applications and the underlying graph processing system. It has access to different components of the system and responds to queries by consulting appropriate components. The main components that the query manager consults are the real-time, in-memory graph storage device 215, the live graph updates 225, the scalable, distributed, fault-tolerant, in-memory graph storage device 230, and the in-memory graph sampler 235.

Each of these components includes different types of information related to the underlying graph. The real-time, in-memory graph storage device 215 includes the latest and most up-to-date changes to the graph. The live graph updates include the live feeds of the changes occurring in the graph. The scalable, distributed, fault-tolerant, in-memory graph storage device 230 represents the underlying base graph without the information in the real-time, in-memory graph storage device 215. The real-time, in-memory graph storage device 215 and the scalable, distributed, fault-tolerant, in-memory graph storage device 230 together include the most up-to-date, complete graph structure. The in-memory graph sampler 235 includes the graph samples merged with the latest changes in the graph. The query manager 240 analyses the query and picks data from one or multiple of these to respond to the query. Queries requiring exact information about the past and the current are usually responded with the real-time, in-memory graph storage device 215 and the scalable, distributed, fault-tolerant, in-memory graph storage device 230. Queries from online, incremental applications are responded using the live graph updates 225. If the applications require quick, approximate results, then the in-memory graph sampler 235 is consulted. The scheduling mechanism in the query manager 240 can be configured and prioritized according to the application priority.

The online, incremental graph computer 245 is used in consideration of these types of applications relying on the live feeds related to the changes in the graph. These live updates are captured by incremental graph algorithms in the online, incremental graph computer 245 and the state is quickly re-established based on these latest changes.

The online, non-incremental graph computer 250 is used in consideration of the fact that some algorithms used by such applications cannot be expressed in the form of incremental graph computation. Some of these applications can benefit from the graph samples provided by the system 200 to get some quick, approximate responses.

The offline graph computer 255 performs the classic batch-style iterative graph computations which are compute intensive. These are not very time-sensitive and are performed offline as low-priority jobs.

Advantageously, system 200 enables fast graph updates, maintains distributed, fault-tolerant temporal graph storage and provides mechanisms for online as well as offline graph computation with exact and approximate results.

Moreover, system 200 advantageously serves as a common platform for distributed, temporal graph storage and graph processing. Applications can be written for online as well as offline analysis. Online, incremental versions can obtain exact computation results, while non-incremental versions can obtain quick, approximate results from the graph samples provided by system 200.

FIGS. 3-4 show an exemplary method 300 for large-scale, dynamic graph storage and processing, in accordance with an embodiment of the present principles. The method 300 is used with a large-scale, dynamic graph storage and processing system such as, for example, system 200. For the sake of brevity and illustration, some of the steps that can be performed by system 200 have been omitted and/or are otherwise implied.

At step 305, receive graph data representing a set of graphs.

At step 310, store the graph data in a scalable, distributed, fault-tolerant, in-memory graph storage device. In an embodiment, the storage device is optimized for query-based retrieval and processing.

At step 315, sample the graphs to generate sampled portions of the graphs. The sampled portions of the graphs can be used to support batch-type computation thereon.

At step 320, receive graph updates. In an embodiment, the graph updates are received from a streaming source.

At step 325, store the graph updates in a real-time, in-memory graph storage device. In an embodiment, the storage device is optimized for rapid data ingestion/assimilation.

At step 330, push the graph updates to relevant components. In an embodiment, the graph updates can be pushed to the scalable, distributed, fault-tolerant, in-memory graph storage device for assimilation therein.

At step 335, publish the graph updates as live feeds. In an embodiment, the live feeds can be published for, and used by, online, incremental graph algorithms.

At step 340, merge the graph updates into the sampled portions of the graphs. The results of the merge can be used by online, approximate, non-incremental graph algorithms.

At step 345, receive a graph query from an application.

At step 350, evaluate the graph query to determine, e.g., query requirements and characteristics of the application from which the graph query was received or which generated the graph query.

At step 355, selectively access or bypass certain elements of the system responsive to an evaluation result from step 350.

At step 360, perform graph computations to satisfy the graph query and/or as required by the system. In an embodiment, the computations can include any of: online, incremental graph computations; online non-incremental graph computations; and offline graph computations. As an example, the graph computations can be performed as required by the system for graph data assimilation into the system or to form various representations of a graph for storage, indexing, and so forth.

At step 365, provide a query result for the graph query.

A description will now be given of some of the many benefits/advantages provided by the present principles.

The present principles advantageously provide a comprehensive, distributed, scalable graph storage and graph processing platform for dynamic graphs, serving as a platform for both online/offline and exact/approximate graph analytics.

The present principles advantageously provide separation of graph updates from graph computation and using specialized data structures for each of them increases the system performance for updates and querying.

The present principles advantageously allow multiple types of applications (e.g., online/offline, incremental/non-incremental, exact/approximate) to be concurrently served by the same system (e.g., system 200).

The present principles advantageously provide a glue device and graph sampler which play significant roles in providing different graph representations to serve different types of graph applications.

The present principles advantageously provide a query manager which distinguishes different types of requests at runtime and responds by automatically consulting appropriate graph representations.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method in a graph storage and processing system, comprising:
    storing, in a scalable, distributed, fault-tolerant, in-memory graph storage device, base graph data representative of at least one graph;
    responsive to receiving update graph data representative of a real-time update to the at least one graph, storing, in a real-time, in memory graph storage device, the update graph data with respect to a time threshold, wherein the base graph data and any received update graph data form a complete graph structure of the at least one graph;
    publishing, by a glue device, any received update graph data as one or more live graph update feeds for use by one or more applications;
    generating one or more sampled portions of the at least one graph, wherein generating the one or more sampled portions includes sampling, by an in-memory graph sampler, the base graph data to generate one or more base sampled portions, and merging, by the glue device, at least one of the one or more base sampled portions with any published update graph data from the one or more live graph update feeds;
    providing, by a query manager, a query interface between the one or more applications and the system; and
    responsive to the query manager receiving a graph-based query from at least one of the one or more applications, processing, by a graph computer, the one or more sampled portions using batch-type computations to generate approximate results for the graph-based query.

2. The method of claim 1, further comprising:
    configuring the scalable, distributed, fault-tolerant, in-memory graph storage device for optimized graph-based retrieval and query processing; and
    configuring the real-time, in memory graph storage device for optimized data assimilation into the system.

3. The method of claim 1, further comprising using different data storage structures for storing the base graph data and the update graph data.

4. The method of claim 3, wherein the different data storage structures implement different storage policies and provide different storage capabilities.

5. The method of claim 1, further comprising indexing, by the scalable, distributed, fault-tolerant, in-memory graph storage device, graph vertices, incoming edges of the graph vertices, and outgoing edges of the graph vertices, to support structural queries on the at least one graph.

6. The method of claim 1, further comprising storing, in the scalable, distributed, fault-tolerant, in-memory graph storage device, temporal-based graph data to support temporal-based graph queries.

7. The method of claim 1, further comprising:
    retiring the update graph data, by the glue device, responsive to a consumption of the update graph data by the one or more applications.

8. The method of claim 7, wherein the update graph data is published, by the glue device, as the one or more live graph update feeds for consumption by one or more online, incremental graph algorithms utilized by the one or more applications.

9. The method of claim 7, wherein the one or more sampled portions are generated for consumption by online, approximate, non-incremental graph algorithms utilized by the one or more applications.

10. The method of claim 7, further comprising pushing, by the glue device, the update graph data from the real-time, in memory graph storage device to the scalable, distributed, fault-tolerant, in-memory graph storage device for assimilation into the at least one graph.

11. The method of claim 10, wherein the update graph data is pushed to the scalable, distributed, fault-tolerant, in-memory graph storage device with respect to the time threshold.

12. The method of claim 1, wherein the update graph data is maintained separately from the base graph data using the real-time, in memory graph storage device and the scalable, distributed, fault-tolerant, in-memory graph storage device.

13. The method of claim 1, further comprising configuring the query manager to respond to a received graph-based query by selectively using one or more of the real-time, in-memory graph storage device, the scalable, distributed, fault-tolerant, in-memory graph storage device, the one or more live graph update feeds, and the in-memory graph sampler depending on query requirements for query result completeness, query search speed, and query result accuracy.

14. The method of claim 1, further comprising configuring the query manager to respond to a received graph-based query by selectively bypassing one or more of the real-time, in-memory graph storage device, the scalable, distributed, fault-tolerant, in-memory graph storage device, the one or more live graph update feeds, and the in-memory graph sampler depending on query requirements for query result completeness, query search speed, and query result accuracy.

15. The method of claim 1, further comprising configuring the query manager to respond to a received graph-based query by selectively accessing or bypassing the real-time, in-memory graph storage device, the scalable, distributed, fault-tolerant, in-memory graph storage device, the one or more live graph update feeds, and the in-memory graph sampler depending on a request type present in the graph query.

16. The method of claim 1, wherein the one or more applications include one or more of an online application, an offline application, an incremental application, a non-incremental application, an exact application and an approximate application.

17. The method system of claim 1, further comprising, responsive to the query manager receiving the graph-based query:
performing, by an online, incremental graph computer, online incremental graph computations; and
performing, by an online, non-incremental graph computer, online non-incremental graph computations;
wherein processing the one or more sampled portions using batch-type computations further comprises performing, by the graph computer, offline, batch-style, iterative graph computations responsive to the graph query.

18. The method of claim 1, further comprising:
receiving, by a real-time processing sub-system, the update graph data from a streaming source; and
processing, by the real-time processing sub-system, the update graph data for dissemination in the system.

19. The method of claim 1, further comprising providing, by the query manager, a plurality of graph representations for the at least one graph depending on at least one of, requirements of a graph-based query and characteristics of an application generating the graph-based query.

* * * * *